United States Patent
Ofer et al.

(10) Patent No.: US 6,353,869 B1
(45) Date of Patent: Mar. 5, 2002

(54) ADAPTIVE DELAY OF POLLING FREQUENCIES IN A DISTRIBUTED SYSTEM WITH A QUEUED LOCK

(75) Inventors: Adi Ofer, Somerville; Tuvia Leneman, Newton; Natan Vishlitzky, Brookline, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/312,146

(22) Filed: May 14, 1999

(51) Int. Cl.[7] .......................... G06F 12/00; G06F 13/22
(52) U.S. Cl. ...................... 710/200; 710/220; 710/240; 711/147; 711/154
(58) Field of Search .................. 710/200, 220, 710/240, 241, 244; 711/100, 147, 150, 151, 154, 167, 169; 713/502

(56) References Cited

U.S. PATENT DOCUMENTS

| | | | |
|---|---|---|---|
| 5,206,939 A | | 4/1993 | Yanai et al. |
| 5,333,286 A | * | 7/1994 | Weinberger et al. .......... 714/47 |
| 5,381,539 A | | 1/1995 | Yanai |
| 5,592,432 A | | 1/1997 | Vishlitzky et al. |
| 5,596,577 A | * | 1/1997 | Perreault et al. ............ 370/449 |
| 5,664,144 A | | 9/1997 | Yanai et al. |
| 5,787,473 A | | 7/1998 | Vishlitzky et al. |
| 6,094,663 A | * | 7/2000 | Snow et al. ................. 707/201 |
| 6,253,273 B1 | * | 6/2001 | Blumenau ................... 710/200 |

OTHER PUBLICATIONS

Michael J. Fisher, Nancy A. Lynch, James E. Burns, Allan Borodin, "Resource Allocation with Immunity to Limited Process Fialure", 20th Annual Symposium on Foundations of Computer Science, San Juan, Puerto Rico, Oct. 1979, p 234–254.

Michael J. Fischer, Nancy A. Lynch, James E. Burns, Allan Borodin, "Distributed FIFO Allocation of Identical Resources Using Small Shared Space", ACM Transactions on Programming Languages and Systems, Jan. 1989 11(1): 90–114.

* cited by examiner

Primary Examiner—Xuan M. Thai
(74) Attorney, Agent, or Firm—Penelope S. Wilson; John M. Gunther

(57) ABSTRACT

A queued lock prioritizes access to a shared resource in a distributed system. Each unsuccessful requestor adaptively delays its next poll for the lock by a period determined as a function of its priority in the lock request queue and the average duration of a significant processor operation involving the resource.

9 Claims, 8 Drawing Sheets

ADAPTIVE DELAY OF POLLING FREQUENCIES IN A DISTRIBUTED SYSTEM WITH A QUEUED LOCK

FIELD OF THE INVENTION

This invention relates generally to a method and apparatus for improving performance in systems where multiple processors contend for control of a shared resource through a queued lock associated with the shared resource, and more particularly to a method and apparatus for improving performance in intelligent data storage systems.

BACKGROUND OF THE INVENTION

When a computer system resource is shared by multiple processes running on multiple processors, or even on one processor, often there must be some way of insuring that no more than one such process may access that resource at any one time. In designing complex data storage systems including multiple processors, synchronizing access to shared resources has been recognized as an issue which must be addressed in order to maintain the consistency and validity of the data. However, the sharing issue may arise in connection with almost any resource than might be used by multiple requestors.

Many high-performance storage systems are intelligent data storage systems which may be accessible by multiple host computers. These may include, in addition to one or more storage device arrays, a number of intelligent controllers for controlling the various aspects of the data transfers associated with the storage system. In such systems, host controllers may provide the interface between the host computers and the storage system and device controllers may be used to manage the transfer of data to and from an associated array of storage devices (e.g. disk drives). Often, the arrays may be accessed by multiple hosts and controllers. In addition, advanced storage systems, such as the SYM-METRIX® storage systems manufactured by EMC Corporation, typically include at least one shared resource in the form of a global memory which is coupled to each of the controllers in the system. The memory may be used as a staging area (or cache) for the data transfers between the storage devices and the host computers and may provide a communications path between the various controllers. Various communication channels, such as busses, backplanes or networks, link the controllers to one another and the global memory, the host controllers to the host computers, and the disk controllers to the storage devices.

To provide reliable access by any host over any host channel to any of the data stored in the data storage devices, it is necessary to coordinate all of the host and device controllers in the system with each other. To simplify this coordination, the global memory is used as a buffer for data transfer between each host controller and each disk controller. Such systems are described, for example, in Yanai et al, U.S. Pat. No. 5,206,939 issued Apr. 27, 1993, (hereinafter "the '939 patent"), Yanai et al, U.S. Pat, No. 5, 381,539 issued Jan. 10, 1995, (hereinafter "the '539 patent"), Vishlitzky et al, U.S. Pat. No. 5,592,432 issued Jan. 7, 1997, (hereinafter "the '432 patent"), Yanai et al, U.S. Pat. No. 5,664,144 issued Sep. 2, 1997 hereinafter "the '144 patent"), and Vishlitzky et al, U.S. Pat. No. 5,787,473 issued Jul. 28, 1998, (hereinafter "the '473 patent"), all of which are herein incorporated in their entirety by reference. The systems described therein provide for distributed management of the global memory resources by the controllers. In these systems, the consistency of the data contained in some portions of global memory is maintained by allowing each controller to lock those data structures which require consistency while it is performing operations which are supposed to be atomic on them.

Typically, synchronization of access to a shared resource, such as the global memory in the systems described above, is accomplished by associating a lock with the resource. Queued lock management allows a processor which initially fails to obtain the lock to queue for subsequent access. Lock management, including the design and operation of lock request queues, is well known in the art, as described, for example, in *Transaction Processing: Concepts and Techniques*, Jim Gray and Andreas Reuter, Morgan Kaufmann Publishers, 1993 edition; *Operating System Concepts*, Abraham Silberschatz and Peter Baer Galvin, Addison-Wesley, 1998 edition: "Resource Allocation with Immunity to Limited Process Failure", Michael J. Fischer, Nancy A. Lynch. James E. Burns, and Alan Borodin, $20^{th}$ *Annual Symposium on Foundations of Computer Science, San Juan, Puerto Rico*, October '79, p 234–254; and "Distributed FIFO Allocation of Identical Resources Using Small Shared Space"*ACM Transactions on Programming Languages and Systems*, January '89, 11(1): 90–114. The lock request queue is a data structure which indicates the current holder of the lock and the priority of unsuccessful lock requests. Generally, the lock request queue must be implemented in a section of memory that is also shared, or at least accessible, by all of the processors which might need access to the shared resource, although it need not be on the same media as the shared resource. The procedures which allocate the lock may be centralized or distributed. In the intelligent data processing systems described above, the lock allocation procedures are typically distributed among the various intelligent controllers.

To obtain the lock for a resource, each requestor from among the processors, such as one of the controllers, must first invoke a lock allocation procedure to attempt to obtain the lock. If it is not awarded the lock, its request will be entered in the lock request queue in accordance with a predetermined priority algorithm. To determine the status of its request, the requester must poll for the lock over the communication channel which links the two. If the lock is not available, the requester must wait, typically for a predetermined, fixed period, and poll again, repeating the loop until the lock is obtained. To minimize resource latency, i.e. "dead" intervals between the time when one processor relinquishes the lock and the next processor obtains it, the polling frequency is typically fixed at a relatively high value. In large systems with high activity, however, high polling rates can saturate communication channels and memory with unproductive calls, thereby seriously degrading the performance of the entire system. In some systems, a separate channel has been dedicated to lock requests in order to avoid these problems. However, this solution has the disadvantage of reducing system throughput by largely eliminating the lock request channel as a resource for productive data transfer within the system.

It would be advantageous therefore to provide a method and apparatus capable of dynamically varying the polling frequencies of multiple unsuccessful requesters in order to reduce both latency and saturation problems without requiring a dedicated lock request channel or otherwise reducing system performance.

SUMMARY OF THE INVENTION

The invention provides a method and apparatus for improving performance in computer systems, and preferably intelligent data storage systems, where a queued lock prioritizes requests for access to a shared resource by contending requesters. In general, the invention provides that when each unsuccessful requestor periodically polls a lock request queue for information on the status of its pending lock request, it obtains information on its priority in the lock request queue and adaptively delays its next poll by a period determined as a function of this priority. In some aspects, the period is also a function of the average duration of a significant operation involving the shared resource. Typically, each unsuccessful requestor estimates, upon each poll, the number of prior entries in the lock request queue and adaptively determines its polling period as a function of the number of prior entries in the lock request queue. In some aspects, the requester may record the duration of one or more of its periodic polls of the lock request queue, and estimate the average duration of a significant processor operation involving the shared resource as a function of one or more of the polling durations it records.

The computer system typically includes multiple processors as requestors, and these are coupled to a shared resource through one or more first common communication channels. A lock allocation procedure is implemented in each of the processors to enable each processor to request locks on the shared resource by each processor and determine, in accordance with a predetermined priority algorithm, the priority of its unsuccessful lock requests.

A lock request queue, responsive to these lock allocation procedures, is implemented in a shared memory accessible over one or more second common communications channels to all of the processors. The lock request queue identifies a successful requester from among the processors as the current holder of the lock on the shared resource, and further indicates the priority of requests for subsequent locks on the shared resource by one or more unsuccessful requestors from among the processors. Each unsuccessful requestor implements a lock polling delay procedure that periodically polls the lock request queue for information on both the status and the priority of the requestor's pending lock request and adaptively determines the requestor's polling period as a function of its priority in the lock request queue. In one aspect, the lock polling delay procedure may also determine the requestor's polling period as a function of the average duration of a significant processor operation involving the shared resource. In another aspect, if the lock request queue is accessed over the same channel as the shared resource, the lock polling delay procedure may record the duration of one or more of its periodic polls of the lock request queue, and the polling durations recorded by the polling delay procedure may be used to estimate the average duration of a significant processor operation involving the shared resource.

In one aspect, the invention provides a method of improving performance in systems wherein multiple controllers may access a shared data resource through at least one first common channel and priority of access to the shared data resource is determined through a queued lock. Each controller requests a lock on the shared data resource by invoking its lock allocation procedure. A lock request queue implemented in a shared memory accessible over at least one second common channel to all of the controllers identifies a successful requestor from among the controllers as the current holder of the lock on the shared data resource, and further indicates the priority of requests for subsequent locks on the shared resource by one or more unsuccessful requestors from among the controllers. The method comprises the following steps. First, the controllers make multiple requests for locks on the shared data resource. A successful requestor from among the controllers obtains the lock and is identified as the current holder of the lock in the lock request queue. Each unsuccessful requester from among the controllers stores its request for a lock on the shared data resource in the lock request queue in accordance with a predetermined priority algorithm. An unsuccessful requestor from among the controllers polls the lock request queue. The unsuccessful requestor determines whether it has become the current holder of the lock and, if not, the estimated number of prior entries in the lock request queue. It then finds as a function of the estimated number of prior entries in the lock queue, the number of significant operations expected to be performed before the unsuccessful requestor obtains the lock. It finds the average duration of a significant processor operation involving the shared resource. The unsuccessful requester calculates the expected duration of the wait before the unsuccessful requestor obtains the lock. This wait is determined as the product of the previously found average duration of a significant processor, i.e. controller, operation involving the shared resource and the previously found number of significant operations expected to be performed. The unsuccessful requestor delays for the expected duration of the wait before repeating its poll. Each unsuccessful processor repeats the polling, determining priority, finding expected number of significant operations, finding average duration, wait calculation and delaying steps until it obtains the lock.

In a preferred aspect, each unsuccessful requestor may poll the lock request queue through one or more of the first common channels and records the duration of one or more of such polls. During the step of finding the average duration of a significant processor operation involving the shared resource, the unsuccessful requestor estimates the average duration of a significant processor operation involving the shared resource as a function of one or more of the polling durations recorded by the unsuccessful requestor.

In another preferred aspect, an intelligent data storage system includes multiple controllers coupled to a shared data resource through one or more first common channels. A lock allocation procedure is implemented in each of the controllers and associated with the shared data resource, for requesting a lock on the shared resource by each the controller and determining in accordance with a predetermined priority algorithm the priority of each controllers unsuccessful lock requests. A lock request queue, responsive to the lock allocation procedures, is implemented in a shared memory accessible over at least one second common channel to all of the controllers. The lock request queue identifies a successful requester from among the controllers as the current holder of the lock on the shared resource, and further indicates the priority of requests for subsequent locks on the shared resource by one or more unsuccessful requestors from among the controllers.

Each of the unsuccessful requestors implements in its lock allocation procedure a lock polling delay procedure that periodically polls the lock request queue for information on the status and priority of its pending lock request and adaptively determines the unsuccessful requestor's polling period as a function of its priority in the lock request queue. The function which determines the unsuccessful requestor's polling period as a function of its priority in the lock request queue may be the product of the number of significant processor, i.e. controller, operations expected to be performed before the unsuccessful requester obtains the lock as a function of the number of prior entries in the lock request queue and the average duration of a significant processor, i.e.

controller, operation involving the shared resource. If the first and second common communication channels are the same, as they are in one preferred aspect of the invention, and each of the unsuccessful requestors records during its lock polling delay procedure the duration of one or more of its periodic polls, the average duration of a significant processor operation involving the shared resource may be estimated as a function of one or more of the polling durations recorded by the unsuccessful requestor.

In yet another aspect of the invention, multiple processes running on a single processor may in some aspects act as requesters, and a lock allocation process or procedure may be invoked by each of these processes, but the operation of the invention is otherwise as described above.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

1. The Architecture of the Preferred System

Figure 1:
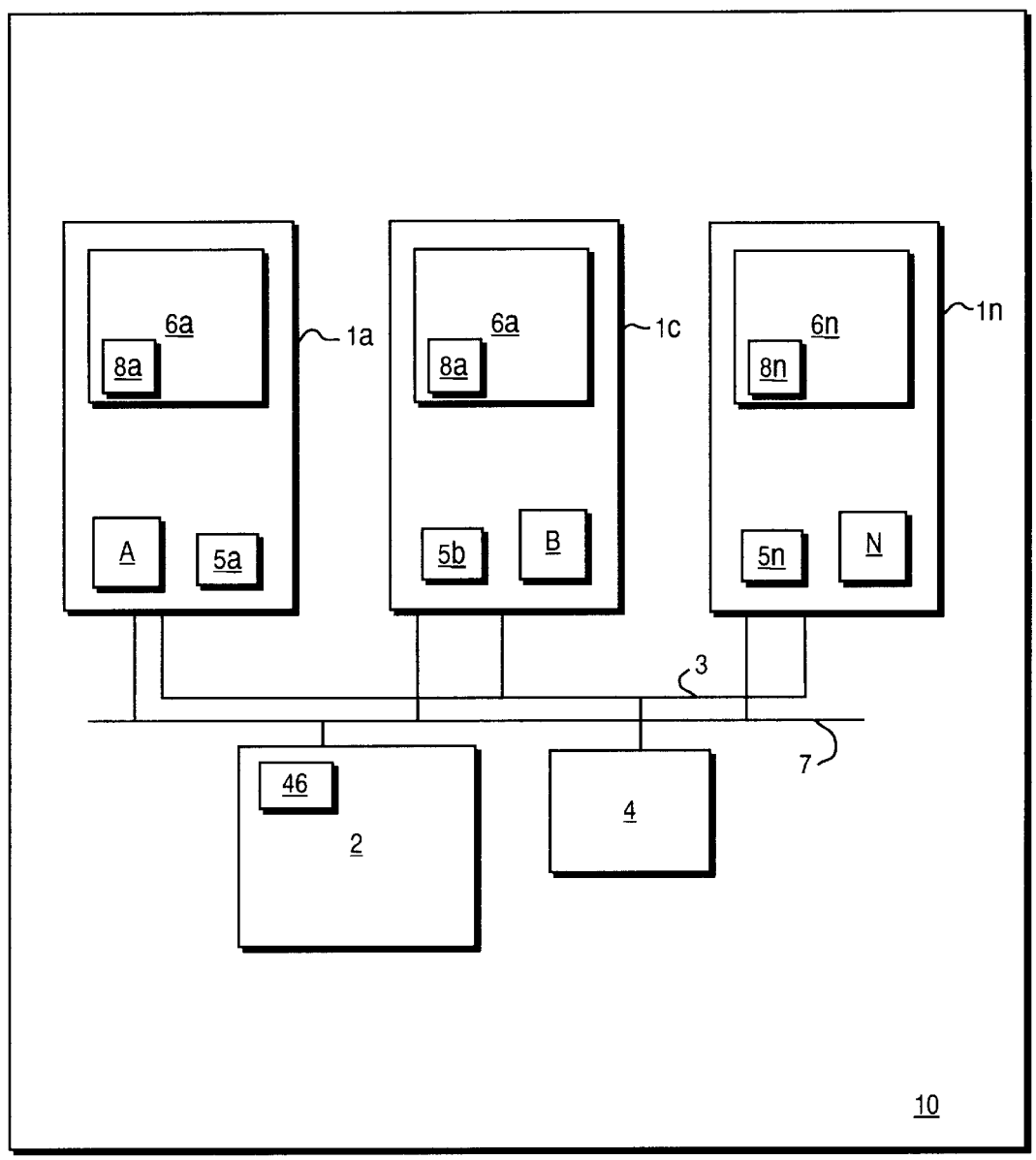
FIG. 1 is a block diagram of a computer system including a shared resource and incorporating the present invention.

Referring now to FIG. 1, computer system 10 is shown to include, among other things, a plurality of processors 1a–1n, running processes A–N, coupled to a shared resource 4 via one or more first common communication channels 3a–n and to a shared memory 2 via one or more second common communication channels 7a–n. For purposes of illustration, only one first common communication channel 3 and one second common communication channel 7 are shown in FIG. 1. Any or all of processors 1a–1n may request access to shared resource 4 in order to execute their processes A–N. The processors are actual or virtual digital processing units which include one or more CPU's and additional local memory 5a–n. For example, processor 1a may be an intelligent device controller, an open-systems computer, a personal computer, a server, an intelligent host controller or a virtual system residing on a mainframe computer. Since each of the computer systems just mentioned typically communicates using a specific communication protocol, each of the first and second common communication channels will correspondingly be those channels specific to the computer system to which they are coupled. That is for example, assuming processor 1c is an open-systems type server (e.g. running the UNIX Operating System), channel 3b or 7b would typically be a SCSI type communications bus or a fibre-channel communications path. All communications over channel 3b or 7b would therefore adhere to the respective SCSI or fibre-channel communications protocols. Processes A–N may be, for example, procedures run by the processors, operating system processes or higher level applications. The processors may run other processes not involving shared resource 4. The invention may also be applicable to multiple processes contending for a shared resource but running on a single processor, although this aspect is not illustrated in the drawings.

To synchronize accesses to the shared resource 4 and provide data consistency, system 10 also provides a queued lock associated with shared resource 4. The queued lock is implemented by a lock request queue 46, further described below, in shared memory 2 and a lock allocation procedure 6a–6n running on each of processors 1a–1n, respectively. The lock request queue, 46, is a data structure which indicates the current holder of the lock and the priority of unsuccessful lock requests, prioritization of lock requests from unsuccessful requestors. Each processor typically invokes its lock allocation procedure, for example procedure 6b for processor 1b, before starting a transaction on the shared resource 4, and may obtain a lock on the shared resource 4 if it is available. Only after a successful requestor from among the processors obtains the lock will that processor perform its transaction on shared resource 4. If the shared resource 4 is already locked at the time the request is received, or if there are multiple simultaneous requests for access, the lock allocation procedure will place the unsuccessful requests in prioritized order on a lock request queue 46. In relevant part, each of the lock allocation procedures 6a–6n incorporates a lock polling delay procedure 8a–8n in accordance with the present invention, which will be further described below. Each lock allocation procedure 6a–6n also typically implements procedures for locking and unlocking operations by a successful lock requestor, selection or priority algorithms for arbitrating among multiple simultaneous requests for locks on the shared resource 4 from multiple unsuccessful requestors 1a–1n, and a polling procedure for allowing a previously unsuccessful requester to determine its current status, by, for example, performing a read-and-compare operation on a predetermined portion of the lock request queue, all of which may be implemented in accordance with algorithms, procedures and methods well-known in the art. Other procedures and algorithms, such as provisions for timeouts and deadlock protection, may also be included in each lock allocation procedure 6a–6n, as is well known in the art.

The shared resource 4 of computer system 10 may be almost any resource than might be used by multiple processes, such as a mass storage device, a memory, a data structure within a memory, an ATM or a communication device. The shared memory 2 of computer system 10 is mutually shared by or accessible to the processors 1a–n. The shared memory 2 and shared resource 4 may be contained in a single logical object, in separate logical objects contained in a single physical object, such as two portions of a global memory, or they may be separate physical and logical objects, such as a memory and a disk drive. In one aspect, described in more detail below, the invention is implemented in an intelligent data storage system which includes several individual components coupled via internal communications channels, and the shared resource 4 is one or more of a set of shared data resources, such as data records, data management records and blocks of data, in the data storage system.

Figure 2A:
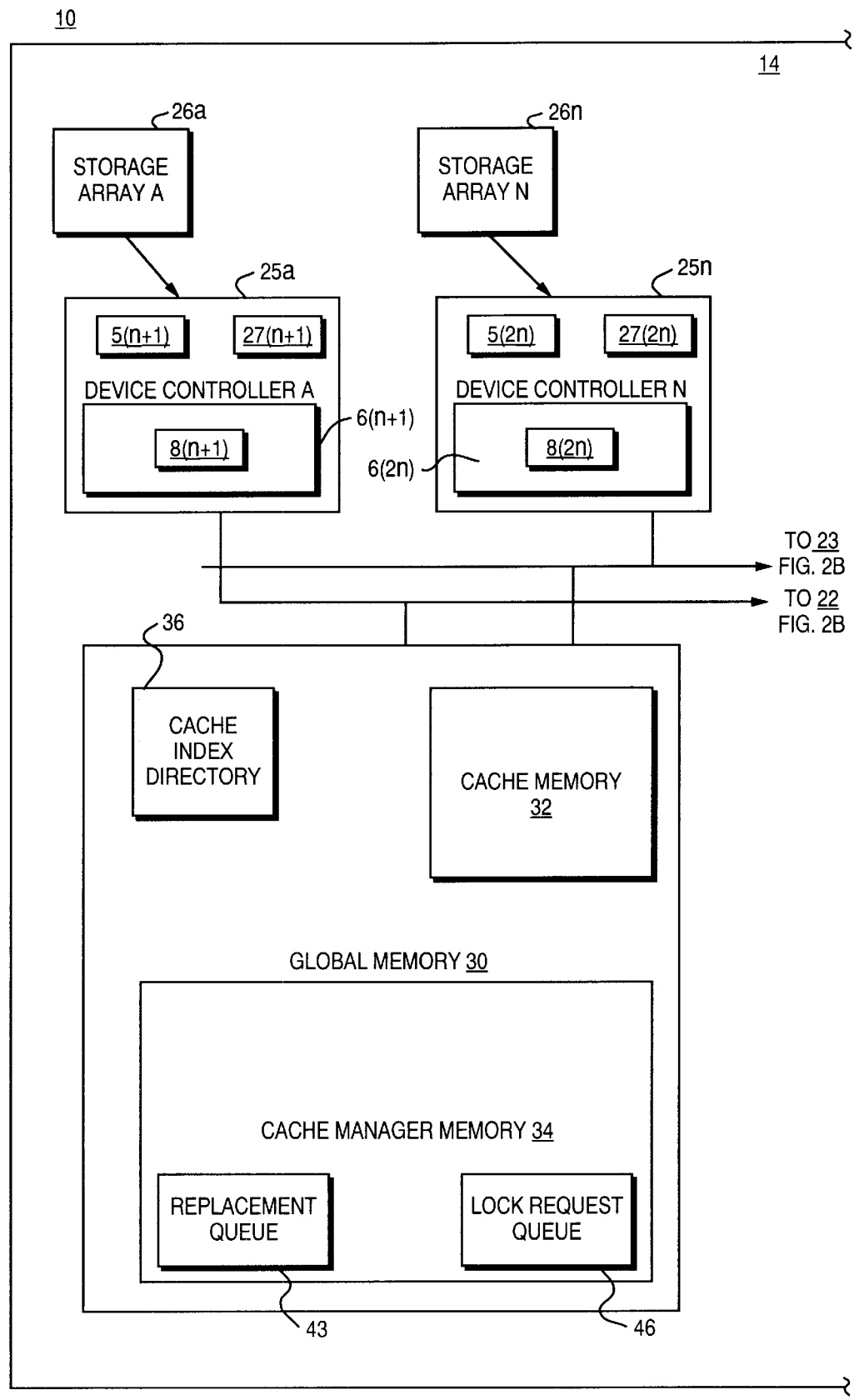
FIG. 2 is a more detailed block diagram of the computer system of FIG. 1 including an intelligent mass storage system.
Figure 2B:
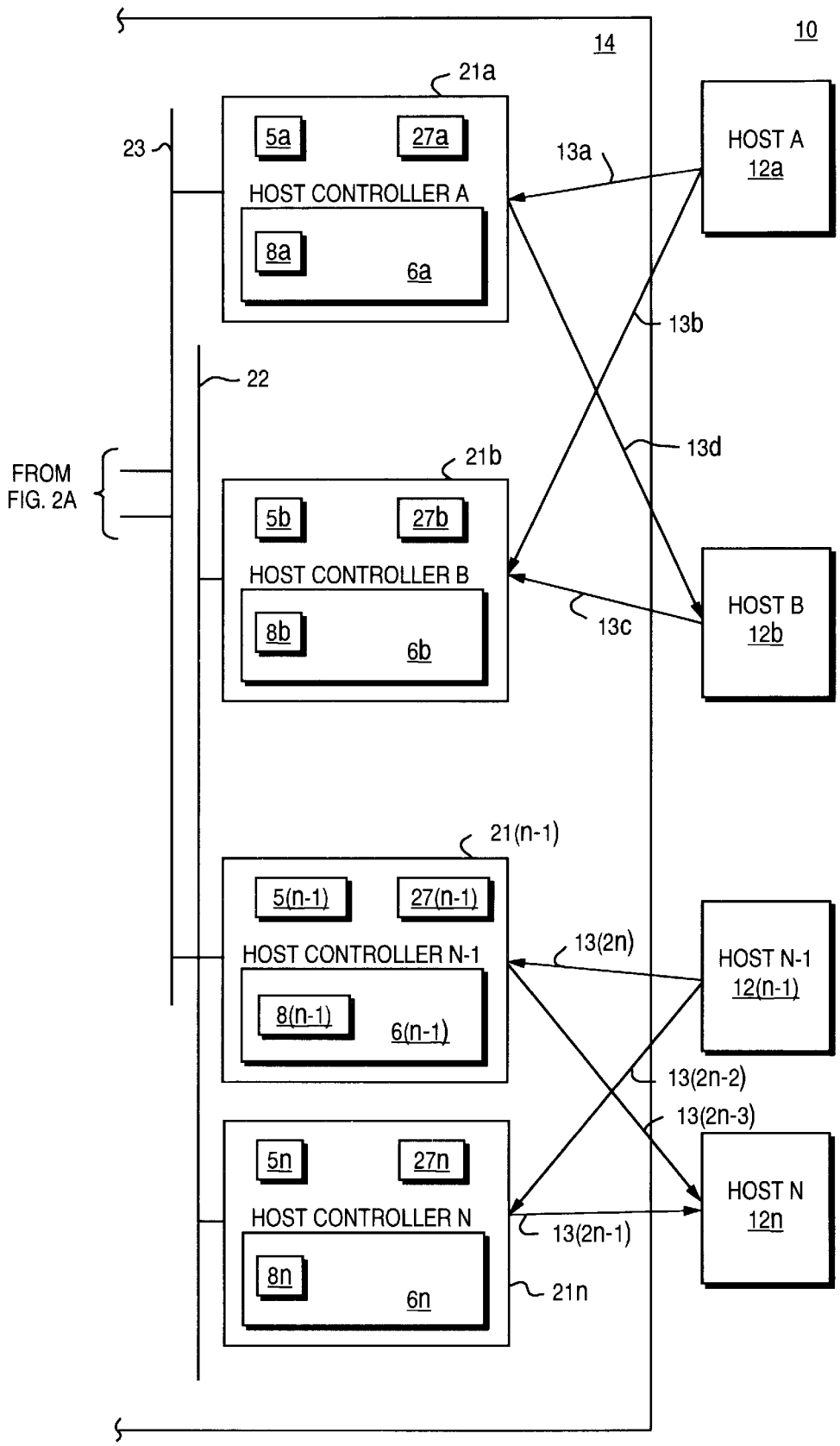

Referring now to FIG. 2 the computer system 10 of FIG. 1 is shown in more detail. Computer system 10 includes an intelligent data storage system 14, and may also include a plurality of host processors 12a–12n connected to the intelligent data storage system 14 by host channels 13a–13(2n). The storage system 14 includes a plurality of host controllers 21a–21n which are, according to a preferred embodiment of the present invention, coupled alternately to buses 22 and 23. Each host controller 21a–21n is responsible for managing the communication between its associated attached host computers and storage system 14. Storage system 14 also includes a global memory 30 coupled to both buses 22 and 23. Preferably, the global memory is a high speed random access semiconductor memory. Global memory 30 includes a large cache memory 32 which is used during the transfer of data between the host computers and the storage devices of arrays 26a–26n. The global memory also includes, as further described below, a cache manager memory 34 and a cache index directory 36 which provides an indication of the data which in stored in the cache memory 32 and provides the addresses of the data which is stored in the cache memory. Also coupled alternately to buses 22 and 23 are a plurality of device controllers 25a–25n. Coupled to each device controller is an array of mass storage devices 26a–26n which as shown here may be magnetic disk devices. As with the host controllers described above, each device controller is responsible for managing the communications between its associated array of drives and the host controllers or global memory 30 of storage system 14.

Figure 3:
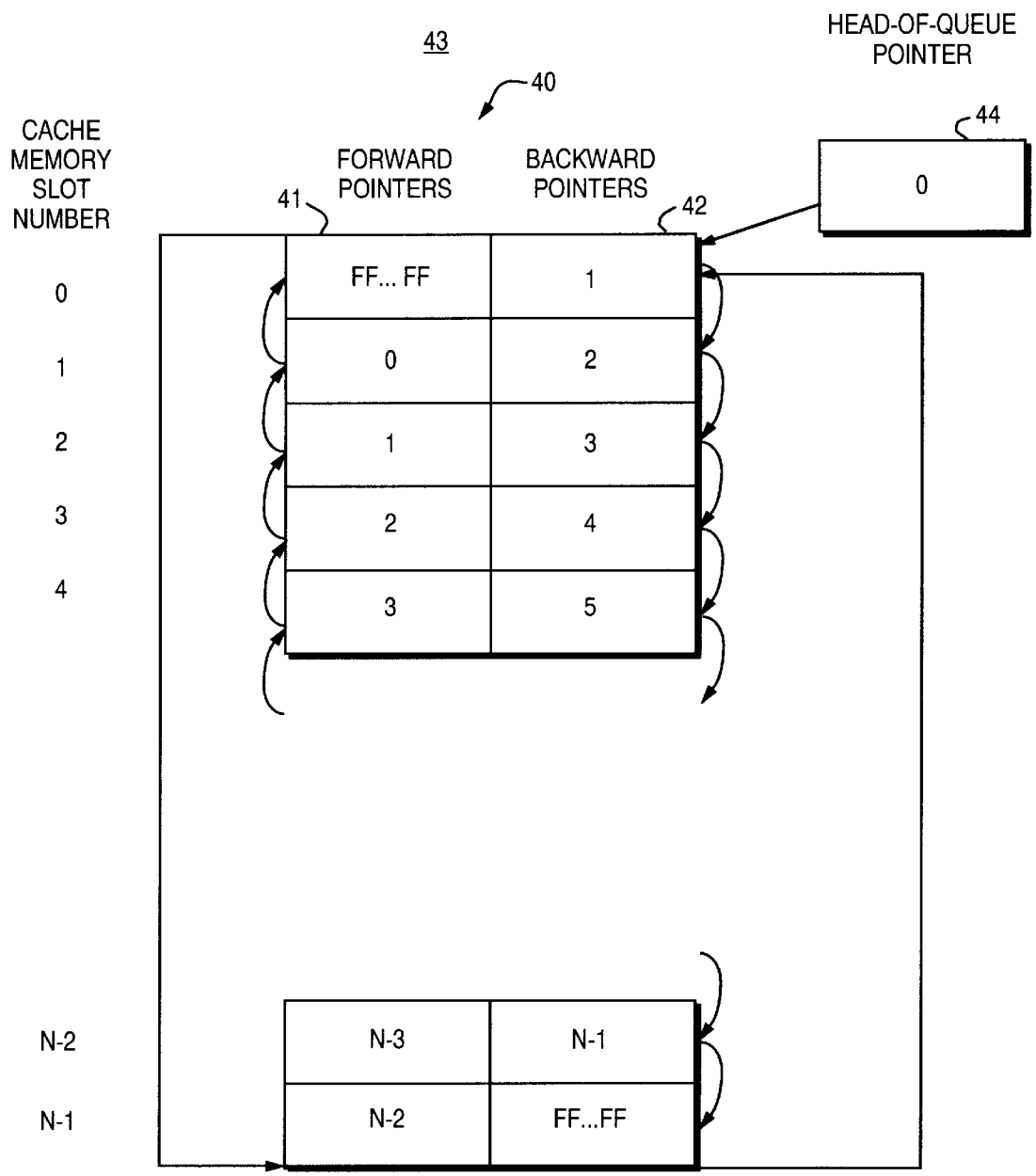
FIG. 3 is a schematic diagram of a replacement queue used for cache management in the intelligent data storage system shown in FIG. 2.

A set of shared data resources in which data may be stored are implemented in data storage system 14 and accessible by a plurality of the processors in system 10. Some or all of the data records, blocks of data and data management records in the global memory 30 and device arrays 26a–26n may be shared data resources. By way of example and in order illustrate certain aspects of the invention, the invention will be explained by treating a single data structure implemented in a portion of global memory 30 as the only shared resource 4. The exemplary data structure, which will be further explained in connection with FIG. 3, is the replacement queue 43 in cache manager memory 34. It will be understood, however, that the typical intelligent data storage system 14 includes many such shared data resources. The invention is equally applicable to any shared data resource 4 in a system 10 which may be accessed by a plurality of the processors through a queued lock. By way of example and not by way of limitation, other shared data resources in intelligent data storage system 14 may include cache index directory 36, other data structures in cache manager memory 34, some or all of the data records in cache memory 10, and some or all of the blocks of data on disk arrays 26a–26n. Intelligent data storage systems for certain applications, such as those supporting airline reservation systems, may require extensive locking of shared data resources, while other applications may require locking of fewer data resources.

In the exemplary embodiment, the lock request queue 46, further described in connection with FIG. 4, is also implemented in cache manager memory. Various procedures may be executed by each of the host controllers 21a–21n and device controllers 25a–25n to access and manage the replacement queue 43 and the lock request queue 46 as well as other shared data resources in cache memory 32, cache index directory 36 and cache manager memory 34, as further described, for example, in the '539 patent, the '467 patent, the '144 patent, and the '473 patent, all of which are herein incorporated in their entirety by reference. Procedures 6a–6 (2n) are the lock allocation procedures, which include, as procedures 8a–8(2n), the novel polling delay procedures of this invention. Procedures 27a–27(2n) are the replacement queue management procedures for host controllers 21a–21n and device controllers 25a–25n respectively. Thus, in the illustrative embodiment, the shared resource is replacement queue 43 implemented in the cache manager memory 34 of global memory 30, the processors 1a–n are the host controllers 21a–21n and device controllers 25a–25n, processes A–N are the replacement queue management procedures 27a–27(2n) which manage the replacement queue 43, and the shared memory 2 is also the cache manager memory 34. The storage busses 22 and 23 provide access to the shared resource 4, so these are the first communication channels 3a–3n. The storage busses 22 and 23 also provide access to the shared memory 2 so these are the second communication channels 7a–7n. Local memory 5a–5n will typically be implemented on host controllers 21a–21n and device controllers 25a–25n.

It should be noted that this example illustrates two preferred aspects of the invention, namely, that the system embodying the invention is the intelligent data storage system 14 and that the processors access the lock request queue 46 over the same channels used to access the shared resource, in this case the replacement queue 43, i.e. the first and second communication channels are identical. However, within the scope of the invention, the processors may be any or all of the host controllers 21a–21n, device controllers 25a–25n, or host computers 12a –12n, the channels 3a–3n may be any or all of channels 13a–13n or busses 22, 23 and the processes A–N may be other processes or procedures relating to other shared data resources. Moreover, the lock request queue 46 need not reside in the same logical device or be accessed over the same channels as the shared resource 4. The invention is also applicable to embodiments where the first and second communication channels are separate.

Referring now to FIG. 3, there is shown a specific embodiment of replacement queue 43 which is formed from a region of shared memory, such as cache manager memory 34. Replacement queue 43 is analogous to the "least recently used" (LRU) queue used in prior art cache managers for readily identifying the least-recently-used data element in the cache. Because the cache memory has a capacity that is smaller than the main memory, it is sometimes necessary for data elements in the cache memory to be removed from or replaced in the cache memory in order to provide space for new data elements being staged into the cache memory. Typically, the cache manager will remove or replace the "least-recently-used" data element in queue 43. Various techniques have been described for dynamically monitoring and adjusting cache parameters, as described, for example, in the '473 patent and the '939 patent, supra. The performance of system 14 is highly dependent on the cache management strategy selected. The strategy is implemented by procedures 27a–27n. Since some of these strategies allow the cache slot at the head of queue 43 to contain something other than the "least-recently-used" data element, queue 43 is referred to more generally as the replacement queue.

In the embodiment shown, the replacement queue 43 is a doubly-linked list of entries, each entry including a forward pointer and a backward pointer. The entries are rows in a table 40 having a respective row for each slot in the cache memory, a first column 41 containing the forward pointers, and a second column 42 containing the backward pointers. As shown in FIG. 3, all of the entries in table 40 are in the replacement queue 43, but this is not necessarily the case except during initialization. During operation of the system, certain entries in table 40 corresponding to cache memory slots which are being protected from removal or replacement will not be in the replacement queue 43.

The replacement queue 43 includes a "head-of-queue" pointer 44, which points to the entry in table 40 for the cache memory slot at the head of the queue. For any entry except the entry at the head of the queue, the forward pointer points to the next entry toward the head of the queue. For any entry except the entry at the tail of the queue, the backward pointer points to the next entry toward the tail of the queue. The backward pointer for the entry at the tail of the queue points to the entry at the head of the queue, and the forward pointer for the entry at the head of the queue points to the entry at the tail of the queue.

Figure 5:
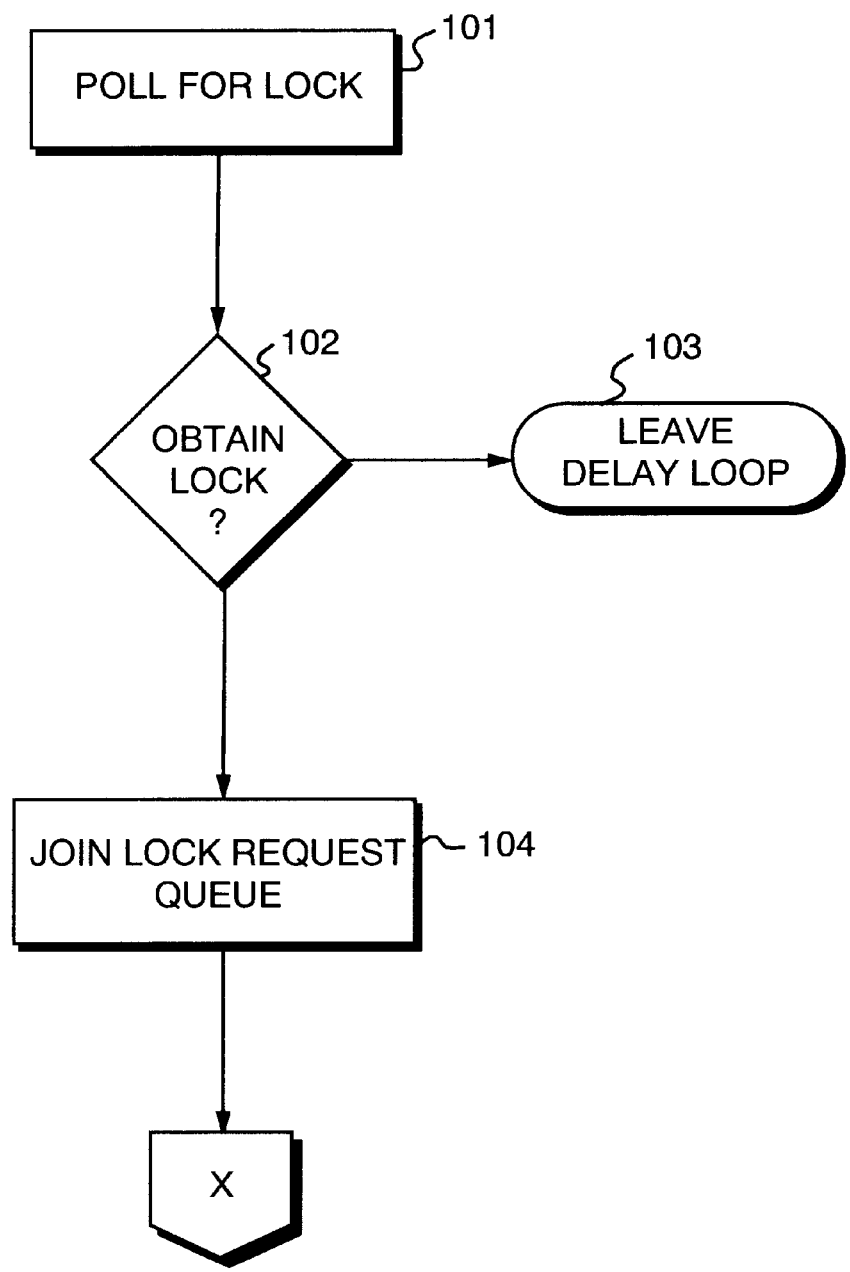
FIG. 5 is a flowchart showing the steps used to initiate the operation of the polling delay procedure in the system of FIG. 1.

Referring now to FIG. 5, the perquisite steps for the initiation of the adaptive polling delay method of the present invention will now be described in connection with the flowchart in FIG. 5. At the start, several of processors 1a–1n are running processes which need to perform atomic operations such as read-modify-writes, on shared resource 4. In order to service its transaction request, the processor 1c, in this case a host controller or device controller, must obtain a lock on at least the data structure which is the target of the request. In some embodiments, a larger portion of the memory in which shared resource 4 is implemented will be locked at the same time. Thus, depending on the implementation, a controller which needs to perform an atomic operation on the head pointer 44 of replacement queue 43 may be required to obtain a lock only on the data structure 44, on the entire replacement queue 43, on cache manager memory 34 or on the entire global memory 30. In the illustrative embodiment, it will be assumed that the entire replacement queue 43 is locked whenever a request is made to modify any portion of it. In the exemplary case, locking of the replacement queue 43 is implemented via the lock request queue 46 in a portion of cache manager memory 34, and the distributed lock allocation procedures 6a–6(2n).

Figure 4A:
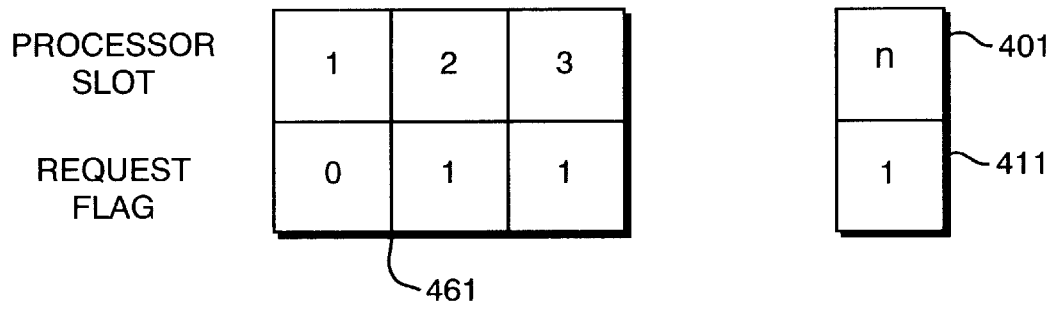
FIG. 4A is a schematic diagram of one embodiment of a lock request queue used to implement the invention in the system of FIG. 1.
Figure 4B:
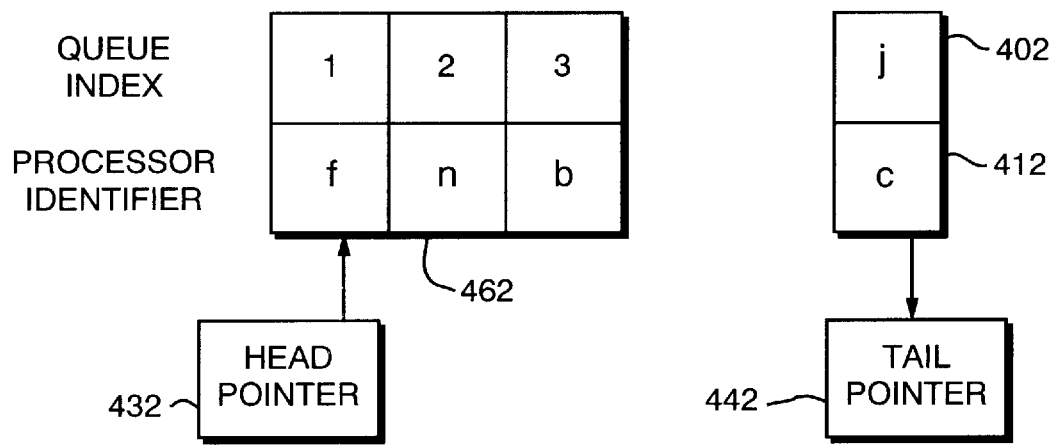
FIG. 4B is a schematic diagram of a second embodiment of a lock request queue used to implement the invention in the system of FIG. 1.
Figure 4C:
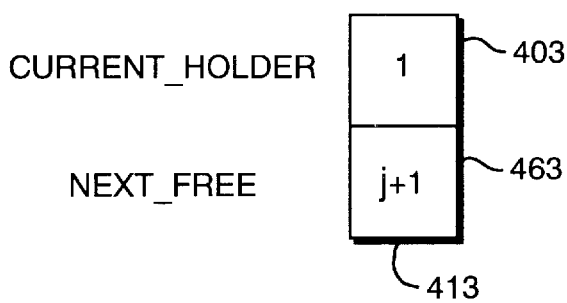
FIG. 4C is a schematic diagram of a third embodiment of a lock request queue used to implement the invention in the system of FIG. 1.

Referring now to FIG. 4, particular embodiments of lock request queue 46 are shown in more detail. In each of FIGS. 4A, 4B and 4C, the lock request queue is diagrammatically represented as a plurality of entries. Each entry in the queue corresponds to a request from a particular processor via its lock allocation procedure for a lock on the replacement queue 43. Although only four entries are shown in each embodiment of queue 46, it should be understood that more or fewer queue entries may be provided, and that the entries may not be queued in the order that the lock requests are made. The number and order of entries in queue 46 is determined by the redetermined lock protocol and by the number of pending requests for the lock.

Thus, in a preferred embodiment of this invention, illustrated in FIG. 4A and implementing a round-robin protocol, the queue 461 is an array which contains a row of processor slot indices 401 and a row of corresponding request flags 411. There is one slot in the array for each processor, with a predetermined index indicating its (fixed) priority in the queue. When a unsuccessful requester determines that its request for the lock has been denied, it sets a flag bit at its slot to indicate that it has joined the queue 46A. When the processor holding the lock is done with its transaction, it passes the lock to the unsuccessful requestor with the next higher (or next lower, depending on the protocol used) index, modulo the length of the array, regardless of when that processor joined the queue.

In another preferred embodiment of this invention illustrated implementing a first-in-first-out (FIFO) protocol, denied requests are queued in the order they are received by the cache manager memory 34. In one variation of a FIFO queue, illustrated in FIG. 4B, the lock request queue is implemented as an indexed queue with a head pointer 432 and a tail pointer 442. Each processor pushes its unique identifier onto the bottom of a queue 462 when its request for a lock is denied and, when the lock is free, the lock manager pops the requests from the top of the queue 462 for processing. The "bakery" or "deli" queue, another FIFO queue variation well known in the art, is illustrated in FIG. 4C. It has the advantage of requiring less shared memory for the queue than the other implementations discussed. As shown in FIG. 4C, a data structure 463 implemented in shared resource manager memory contains a variable 403 indicating the CURRENT_HOLDER of the lock, and another variable 413 indicating the NEXT_FREE position in the lock request queue. A requesting process joins queue 463 by performing an atomic operation which reads the existing value of 413 (NEXT_FREE) into its local memory as MY_NUMBER, incrementing the read value of NEXT_FREE and writing the incremented value of NEXT_FREE back into the variable 413 in the shared data structure. A local memory 5a–5n dedicated respectively to each of processors 1a–1n includes a fixed region for storing data structures and parameters useful in the lock manager and delay processes, including PROCESS_ORLQUEUE_POSITION, OPERATION_QUEUE_LENGTH, OPERATION_DURATION, and LONG_DELAY, and DELAY. Typically, OPERATION_QUEUE_LENGTH, is a look_up table of numerical values, although it may also be a numeric constant, and the others are numeric variables. In some aspects, variable parameters POLLING_TIME, SAFE_DELAY, or MY_NUMBER, are also included. The structure and purpose of these parameters will be explained in more detail in connection with FIGS. 6 and 7. In some aspects, a constant, SMALL_DELAY, may also be included, as discussed in connection with FIG. 5.

Turning now to FIG. 5, in step 100, processor 1c invokes its lock allocation procedure 6c in order to make a first attempt to obtain the lock on shared resource 4. As shown in FIG. 5, in step 101, processor 1c polls for the lock for the first time. If, at step 102, it determines that it has obtained the lock, it leaves the lock request loop at step 103. If the initial lock request by processor 1c is found to be unsuccessful at step 102, it will be assigned the j'th place in lock request queue 46 at step 104, and begin the lock polling delay procedure.

Figure 6:
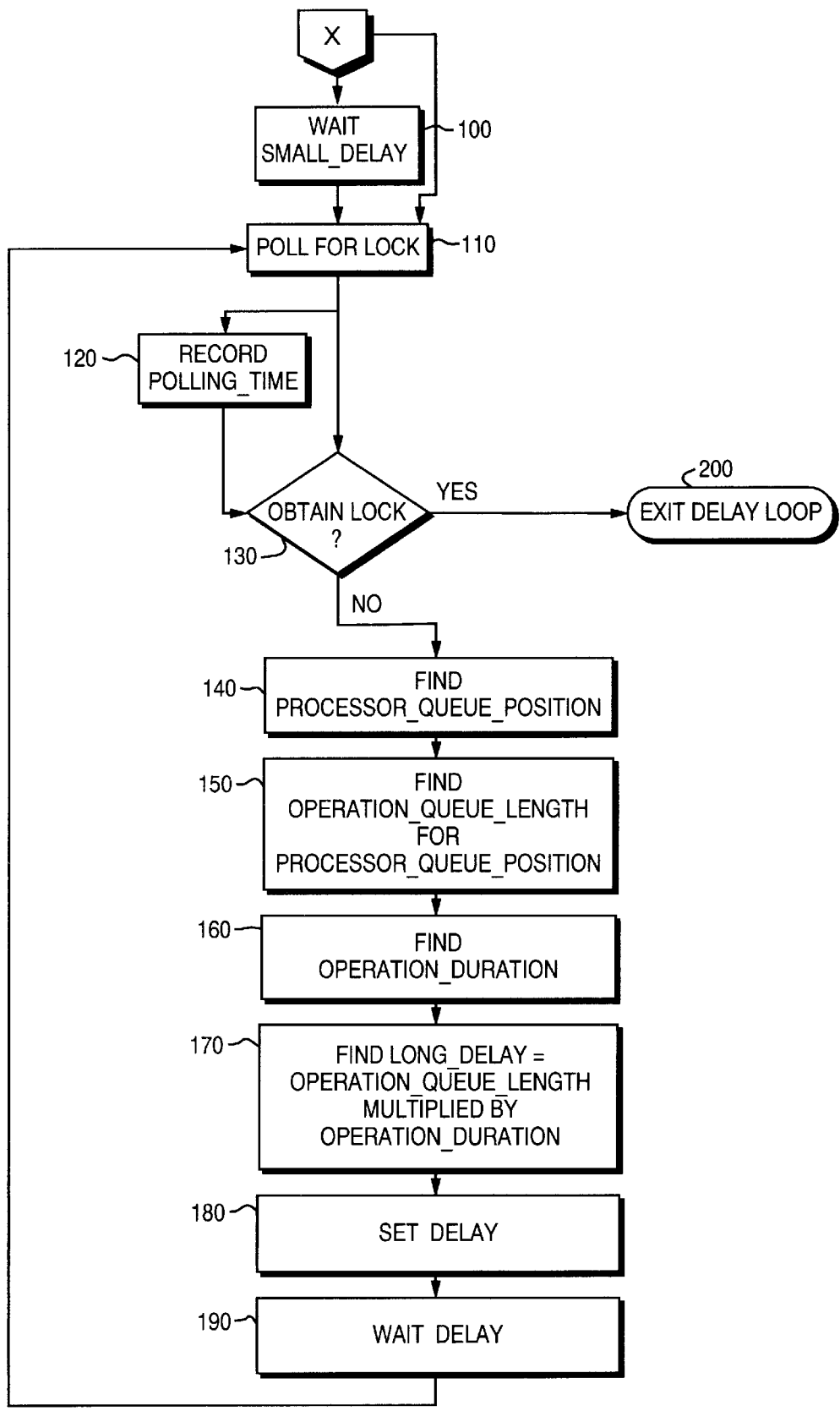
FIG. 6 is a flowchart showing the operation of the system of FIG. 1 in using the polling delay procedure of the present invention.

Referring now to FIG. 6, the operation of the lock polling delay procedure of the present invention will be explained in connection with the flowchart. In one aspect of the invention, shown at step 105, processor Ic waits for a small preestablished period, SMALL_DELAY, before its next poll. In some aspects, SMALL_DELAY may also be added as OPERATION_QUEUE_LENGTH_0 into the OPERATION_QUEUEE_LENGTH array for that processor. In another aspect, the next poll is done immediately. SMALL_DELAY and OPERATION_QUEUE_LENGTH are typically stored in local memory 5c. SMALL_DELAY is an interval intended to prevent immediate repolling by a processor just entering the lock request queue. It may be set at a small constant, such as, for example, the duration of an average operation involving the shared resource when there is no channel saturation.

In either case, execution continues at step 110 shown in FIG. 6. At step 110, requestor 1c, having made at least one unsuccessful poll, already holds the j'th place in lock request queue 46. It sends its n'th poll at step 110 by sending a read request for the identification of the lock holder to the lock request queue 46 in shared memory 2 over the channel 3b. This is known as polling for the lock. If the system is designed so that processors access the shared resource 4 and the lock request queue 46 over the same channels, it is preferred that execution continue with step 120. If they are accessed over different channels, then it is preferred that execution continue at step 130.

At step 120, the unsuccessful requester 1c records its n'th polling time, POLLING_TIME_n, the time interval between sending the n'th polling request to shared memory 2 and receiving a response. The polling times for each processor may preferably be stored in an array, POLLING_TIME, stored in local memory 5c for processor 1c.

At step 130, processor 1c receives the identification of the lock holder through channel 3b and compares it with its own lock identification to determine whether its lock request has been granted. If the lock request is granted, then at step 200, processor 1c takes the lock and leaves the adaptive polling process to begin executing its transaction request. If the lock request is unsuccessful, then at step 140, the processor 1c finds PROCESSOR_QUEUE_POSITION, the number of prior entries in lock request queue 46. For request queue 46a shown in FIG. 4A, processor 1c may estimate the number of prior entries in the lock queue by counting the number of bits set ahead of it (or behind it, depending on the protocol) in the queue. This is not necessarily the number of processors which will hold the lock before processor 1c obtains it, since a unsuccessful requester which requests the lock after processor 1c has joined the queue and found PROCESSOR_QUEUE_POSITION, but which has an intervening index in the queue will not be counted but will take the lock before processor 1c. For request queues 46b and 46c shown in FIGS. 4B and 4C respectively, the number of prior entries may be determined exactly. For queue 46b, it is the difference between the indices of the top and bottom of the stack, and for queue 46c, it is the difference between the values of CURRENT_HOLDER and MY_NUMBER. At step 150, the processor 1c finds OPERATION_QUEUE_LENGTH, as function of PROCESSOR_QUEUE_POSITION. OPERATION_QUEUE_LENGTH is the expected number of significant operations which will be performed by the queued processors before processor 1c obtains the lock. In one embodiment, the average number of significant operations per processor is a predetermined constant which processor 1c multiplies by PROCESSOR_QUEUE_POSITION to obtain the OPERATION_QUEUE_LENGTH. However, the OPERATION_QUEUE_LENGTH is not always a linear function of PROCESSOR_QUEUE_POSITION. In a preferred embodiment, the predetermined OPERATION_QUEUE_LENGTH for each PROCESSOR_QUEUE_POSITION is stored in a lookup table, and processor 1c uses this table to find the applicable value of OPERATION_QUEUE_LENGTH. In a preferred embodiment, the value of OPERATION_QUEUE_LENGTH varies approximately logarithmically with PROCESSOR_QUEUE_POSITION.

In an alternative embodiment, OPERATION_QUEUE_LENGTH may be dynamically computed based on period 1c sampling, but the use of historical values is preferred if such sampling increases channel traffic significantly. It is preferred that any historical values used to determine OPERATION_QUEUE_LENGTH, such as constant S or the lookup table, be stored in local memory 5a–5n on each processor 1a–1n to minimize channel traffic, although other segments of memory may be used. In determining which operations are significant, the relative duration of the various kinds of operations which the processors typically perform should be considered. In the exemplary embodiment, the durations of operations performed entirely within each processor are orders of magnitude shorter than the durations of operations involving accesses to global memory over the shared channels. Thus, for embodiments involving only global memory accesses and processor operations, only operations involving global memory accesses over channels 3a–n need to be counted as significant operations. In other systems, the significant operation in terms of duration, may, for example, be the disk seek time, while in others all operations may be equally significant. At step 160, processor 1c finds the OPERATION_DURATION, the average duration of a significant operation.

In one aspect, most suited to systems where the unsuccessful requesters do not access the shared resource 4 and the shared memory 2 over the same channels, or where channel access time is insignificant compared to some other aspect of the average duration of a significant operation, the OPERATION_DURATION is a predetermined constant, preferably stored in local memory 5a–5n on each of processors 1a–1n.

However, in multiprocessor systems which must contend for access to communications channels, the duration of a significant operation may vary significantly, depending on how heavily the system is loaded. When such a system is loaded, there exists more contention for communications channels, and a larger number of the significant operations involve channel arbitration delays. In very large, very fast transaction processing systems such as data storage system 14, the system loading, and hence the duration of a significant operation, can change rapidly. Thus is preferred that OPERATION_DURATION be determined as a function of the actual durations of sampled significant operations, and that it be dynamically variable. In a preferred embodiment, OPERATION_DURATION is determined by processor 1c as a function of one or more of the values in its current POLLING_TIME array, since polling for a lock is in fact a significant operation involving arbitration for access to a shared channel. A single value selected from this array of values may be used, for example the most recent entry, or a weighted or unweighted average of several values may be used. More preferably, processor 1c calculates OPERATION_DURATION as the unweighted average of all the values in its POLLING_TIME array, POLLING_TIME_i. In one aspect, where a small constant, SMALL_DELAY, is used as the DELAY value for the initial poll by each processor, the constant is added into the unweighted average for each subsequent poll by that processor as POLLING_TIME_0.

For purposes of illustration, steps 140 and 150 have been described as occurring before step 160. However, step 160 may be performed at any time after step 120, and need not wait for the completion of steps 140 and 150.

At step 170, processor 1c finds LONG_DELAY, the expected duration of the wait before processor 1c obtains the lock, by multiplying OPERATION_DURATION and OPERATION_QUEUE_LENGTH. At step 180, processor 1c sets the value of DELAY. Typically, it sets DELAY equal to the value of LONG_DELAY. However, in accordance with another aspect of the invention, the processor may use additional information about the PROCESSOR_QUEUE_POSITION or the value of LONG_DELAY to control its decision on whether to wait for the duration of the LONG_DELAY or to use another delay interval. This aspect will be further described in connection with FIG. 7.

At step 190, processor 1c delays for the duration of the wait, DELAY, before repeating its poll. Execution then continues at step 110, where processor 1c again polls for the lock. Because the LONG_DELAY is determined as a function of the value obtained for PROCESSOR_QUEUE_POSITION, the polling frequency of processor 1c is automatically adjusted according to how close to the head of the queue it is if it sets its DELAY equal to LONG_DELAY. Reducing the polling frequency of the unsuccessful requestors far back in the lock request queue is desirable in order to free bandwidth. If, however, polling is reduced too much, there will be excessive latency due to transfer pauses when no unsuccessful requester is able to access the shared resource. Excessive latency is most likely to occur under one of three conditions. First, it would probably be desirable for an unsuccessful requestor which is or might be very close to the head of queue to do its first poll very quickly in order to see if the lock is free. Second, because LONG_DELAY is just an estimate of expected processor performance, very large values of LONG_DELAY could cause excessive latency if no safeguard is provided. Finally, because timeouts and other transaction failures which cause the queue to be reset do occur on an unpredictable but statistically inevitable basis, it would be desirable for unsuccessful requesters not to wait too long between polls.

Figure 7:
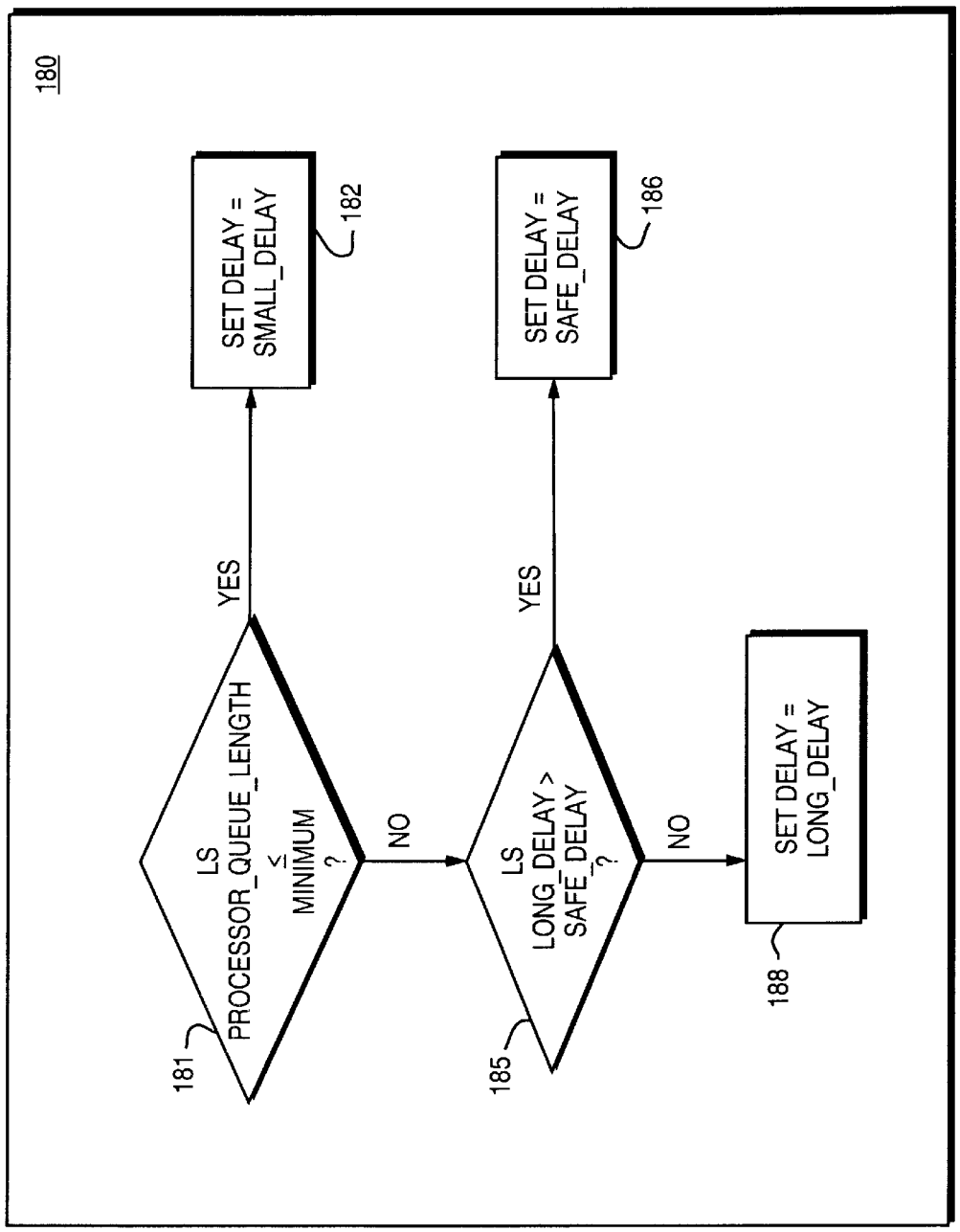
FIG. 7 is a flowchart showing an alternative aspect of step 180 of FIG. 6 in implementing the polling delay procedure of the present invention.

In one aspect of the invention, illustrated in FIG. 7, step 180 has been expanded to cover these conditions. In order to set the value of DELAY, processor 1c first determines at step 181 whether PROCESSOR_QUEUE_POSITION is less than or equal to a predetermined minimum value, MINIMUM, such as one, two or three. The minimum value is set based on the characteristics of the system. If it is less, indicating that processor 1c is close to the head of the queue, then at step 182, processor 1c sets DELAY equal to the predetermined constant SMALL_DELAY, and continues execution at step 190.

If PROCESSOR_QUEUE_POSITION is not less than MINIMUM, then processor 1c determines at step 185 whether the value of LONG_DELAY is greater than the value of a predetermined maximum value, SAFE_DELAY. Typically the processor 1c finds SAFE_DELAY, as function of PROCESSOR_QUEUE_POSITION. In one embodiment, the average number of significant operations per processor is a predetermined constant which processor 1c multiplies by PROCESSOR_QUEUE_POSITION to obtain the SAFE_DELAY. However, the SAFE_DELAY is not always a linear function of PROCESSOR_QUEUE_POSITION. In a preferred embodiment, the predetermined SAFE_DELAY for each PROCESSOR_QUEUE_POSITION is stored in a lookup table, and processor 1c uses this table to find the applicable value of OPERATION_QUEUE_LENGTH. In a preferred embodiment, the value of SAFE_DELAY varies approximately logarithmically with PROCESSOR_QUEUE_POSITION.

If the value of LONG_DELAY exceeds the value of SAFE_DELAY, either the queue length or the average operation time, or both is unusually long and it is very likely that the LONG_DELAY estimate is inaccurate. In addition, during such a long interval, timeouts or other such events may occur. In this case, processor 1c sets the value of DELAY equal to SAFE_DELAY at step 186 and continues execution at step 190. If it is not, at step 188 processor sets the value of DELAY equal to LONG_DELAY as previously indicated, and continues execution at step 190.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What we claim is:

1. In a computer system wherein
   a plurality of processors contend for access to a shared resource through a queued lock including a lock request queue associated with said shared resource and implemented in a shared memory,
   wherein said lock request queue identifies a successful requestor from among said processors as the current holder of the lock on said shared resource, and further indicates the priority of requests for subsequent locks on said shared resource by one or more unsuccessful requesters from among said processors,
   a method of improving system performance wherein each unsuccessful requestor implements a lock polling delay procedure that periodically polls said lock request queue for information on both the status and the priority of said requestor's pending lock request and adaptively determines said requestor's polling period as a function of its priority in said lock request queue.

2. A system according to claim 1 wherein said lock polling delay procedure also determines said requestor's polling period as a function of the average duration of a significant processor operation involving the shared resource.

3. A system according to claim 2 wherein said lock polling delay procedure records the duration of one or more of its periodic polls of said lock request queue, and wherein said average duration of a significant processor operation involving the shared resource is estimated as a function of one or more of the polling durations recorded by said polling delay procedure.

4. A method of improving performance in computer system systems including data storage wherein each of a plurality of controllers may obtain access to a shared data resource through at least one first common channel by invoking a lock allocation procedure implemented in each of said controllers and associated with said shared data resource to request a lock on the shared data resource,
   and wherein a lock request queue implemented in a shared memory accessible over at least one second common channel to all of the controllers identifies a successful requestor from among said controllers as the current holder of the lock on said shared data resource, and further indicates the priority of requests for subsequent locks on said shared data resource by one or more unsuccessful requesters from among said controllers, said method comprising the steps of:
   a) making by the controllers a plurality of requests for locks on the shared data resource;
   b) obtaining a lock by a successful requester from among said controllers and identifying said successful requester as the current holder of the lock in the lock request queue;
   c) storing by each unsuccessful requestor from among said controllers in the lock request queue in accordance with a predetermined priority algorithm, its request for a lock on the shared data resource;

d) polling, by an unsuccessful requester from among said controllers, the lock request queue;

e) determining, by said unsuccessful requester, whether it has become the current holder of the lock and, if not, the estimated number of prior entries in the lock request queue;

f) finding as a function of the estimated number of prior entries in the lock queue, by said unsuccessful requestor, the number of significant operations expected to be performed before said unsuccessful requester obtains the lock;

g) finding, by said unsuccessful requester, the average duration of a significant processor operation involving the shared resource, h) calculating as the product of the previously found average duration of a significant processor operation involving the shared resource and the previously found number of significant operations expected to be performed, by said unsuccessful requester, the expected duration of the wait before said unsuccessful requestor obtains the lock; and, i) delaying, by said unsuccessful requester, for said expected duration of said wait before repeating its poll; and j) repeating, by said unsuccessful processor, steps, d) through i) until it obtains the lock.

5. The method according to claim 4 further comprising the steps of:

a) during said polling step, polling said lock request queue through one or more of said first common communication channels;

b) recording, by said unsuccessful requestor, the duration of one or more of such polls; and, c) during said step of finding, by said unsuccessful requestor, the average duration of a significant processor operation involving the shared resource, estimating said average duration of a significant processor operation involving the shared resource as a function of one or more of said polling durations recorded by said unsuccessful requestor.

6. An intelligent data storage system comprising:

a shared data resource coupled to one or more first common communication channels;

a plurality of controllers coupled to said shared data resource through said first common communication channels;

a lock allocation procedure implemented in each of said controllers and associated with said shared data resource, for requesting a lock on the shared resource by each said controller and determining in accordance with a predetermined priority algorithm the priority of each said controller's unsuccessful lock requests;

a lock request queue, responsive to said lock allocation procedures, implemented in a shared memory accessible over one or more second common communication channels to all of the controllers, said lock request queue identifying a successful requester from among said controllers as the current holder of the lock on said shared resource, and further indicating the priority of requests for subsequent locks on said shared resource by one or more unsuccessful requestors from among said controllers, wherein each of said unsuccessful requesters implements in its lock allocation procedure a lock polling delay procedure that periodically polls said lock request queue for information on the status and priority of its pending lock request and adaptively determines said unsuccessful requestor's polling period as a function of its priority in said lock request queue.

7. A system according to claim 6 wherein said function which determines said unsuccessful requestor's polling period as a function of its priority in the lock request queue is the product of the number of significant processor operations expected to be performed before said unsuccessful requestor obtains the lock as a function of the number of prior entries in said lock request queue and the average duration of a significant processor operation involving the shared resource.

8. A system according to claim 7 wherein said first and second common communication channels are the same, wherein each of said unsuccessful requestors records during its lock polling delay procedure the duration of one or more of its periodic polls, and wherein said average duration of a significant processor operation involving the shared resource is estimated as a function of one or more of said polling durations recorded by said unsuccessful requestor.

9. In a computer system wherein a lock request queue implemented in shared memory indicates the priority of the unsuccessful requestors from among a plurality of processors for locks on a shared resource and wherein each of said unsuccessful requesters periodically polls said lock request queue, a method of improving system performance wherein each unsuccessful requestor estimates, upon each poll, the number of prior entries in said lock request queue and adaptively determines said requestor's polling period as a function of said number of prior entries in said lock request queue.

* * * * *